United States Patent [19]
Rasenberger et al.

[11] 3,881,382
[45] May 6, 1975

[54] FLYING SHEAR FOR CROSS-CUTTING MOVING SHEET-METAL STRIP

[75] Inventors: Otto Rasenberger, Goeppingen; Hans Braun, Weilheim, Teck, both of Germany

[73] Assignee: L. Schuler GmbH, Goppingen, Germany

[22] Filed: Oct. 15, 1973

[21] Appl. No.: 406,358

[30] Foreign Application Priority Data
Oct. 13, 1972 Germany............................ 2250242

[52] U.S. Cl. .................. 83/305; 83/320; 83/530; 83/556; 83/559
[51] Int. Cl. ........................................... B23d 25/02
[58] Field of Search ............ 83/305, 304, 320, 319, 83/530, 527, 556, 559

[56] References Cited
UNITED STATES PATENTS

| | | | |
|---|---|---|---|
| 1,677,180 | 7/1928 | Green et al. | 83/305 |
| 2,767,789 | 10/1956 | Budlong et al. | 83/556 X |
| 3,122,042 | 2/1964 | Littell et al. | 83/556 X |
| 3,202,029 | 8/1965 | Morath | 83/304 |
| 3,342,092 | 9/1967 | Bearer | 83/320 |

*Primary Examiner*—J. M. Meister
*Attorney, Agent, or Firm*—Craig & Antonelli

[57] ABSTRACT

Flying shear apparatus for cross-cutting moving sheet material including upper and lower cutting bars movable together in the travel direction of the sheet material and reciprocating means for moving the lower bar in a cutting direction toward said upper bar and transverse to the travel direction. The reciprocating means includes a drive shafat rotatably at a continuous rotational speed and levers for transmitting the rotation of the drive shaft to linear movement of the lower cutter bar. The pivot axle of one of the levers interconnecting the drive shaft with the lower cutting bar is connected to a press rod which is adjustably movable so as to effect changes in the cutting stroke without changing the rotational speed of the drive shaft. With this arrangement, the cutting stroke can be adjusted to accommodate varying thickness sheet materials and to accommodate selective non-cutting strokes so as to vary the length of material being cut. The press rod is adjusted by a rack and eccentric gear arrangement. The upper and lower cutting bars are interconnected by a pair of guide arms and a coupling member so that a driving connection need only be provided at the upper cutter bar. Each of the guide arms are pivotally connected at the upper cutter bar and at a coupling member pivotally mounted intermediate the ends thereof at the lower cutter bar. The upper cutter bar is provided with hydraulically or pneumatically actuable piston-cylinder means for effecting pivotal movement of the cutter holder accommodating the cutting blade so as to accommodate oblique angle cuts.

24 Claims, 6 Drawing Figures

FLYING SHEAR FOR CROSS-CUTTING MOVING SHEET-METAL STRIP

BACKGROUND AND SUMMARY OF THE INVENTION

This invention relates to a flying shear for the cross-cutting of moving sheet-metal strip with a lower and an upper cutter bar, both of which cutter bars are reciprocatable in the traveling direction of the sheet-metal strip, and one of which cutter bars can be driven in the cutting direction by means of a crank drive running at a uniform speed by way of a gear system. A conventional flying shear of a similar type has only one tool with an invariable stroke for the separation of moving pipes, rolled bars, or the like (German Pat. No. 948,664).

The invention contemplates constructing the drive or gear system of a shear of the above-described general type so that the stroke of the cutter bar drivable in the cutting direction is variable. Sheet-metal strips of various thicknesses, can be severed due to the variability of the cutter bar stroke. Also, the cutting operation can be interrupted to obtain sheet-metal strip sections of various length by appropriate varying of the cutting stroke so as to not cut on certain reciprocating movement thereof.

The present invention further contemplates providing that the gear or drive system has a coupling member which is hingedly attached at one end to a rotating crank drive, and at the other end, via a swivel arm, to the cutter bar executing the cutting motion. Between the ends of the coupling member it is connected to a press rod which swings about an axle. The advantage of such a gear system resides particularly in that it is possible to vary, to an extent satisfying all practical requirements, the deflection of the end of the coupling member articulated to the swivel arm, and thus the stroke of the cutter bar executing the cuttion motion, by changing the various mounting points of the arrangement while leaving the crank drive unaltered. According to a preferred embodiment of the invention, the mounting points of the arrangement are changed in a simple manner by adjusting the axle of the swinging press rod at right angles to the longitudinal extension thereof.

Both cutter bars must be reciprocated in the travel direction of the sheet-metal strip so that their velocity in this travel direction during the cutting operation is maximally synchronized with the speed of the sheet-metal strip, even in case of high cutting rates per minute. If, for the sake of simplicity of construction, only one of the two cutter bars is directly driven to be reciprocatable in the travel direction of the sheet-metal strip, then this movement must be transmitted from this cutter bar to the other cutter bar. The present invention contemplates connecting both cutter bars by a linear guide with each other. The linear guide includes a coupling member and two guide arms. The two guide arms of the linear guide are articulated to the same cutter bar while the coupling member articulates the two guide arms together and is hingedly joined to the other cutter bar.

A flying shear of this type can also be used, in accordance with another additional feature of the invention, for the oblique cutting of moving sheet-metal strip by providing that each cutter bar consists of a slide and a cutter holder, both of which can be moved to and fro in the travel direction of the sheet-metal strip, and that the cutter holders can be pivoted about a common axis extending in the cutting direction. By this construction of the cutter bar and the pivotability of the cutter holders in accordance with the present invention, the advantage is obtained, in particular, of a higher number of cuts per minute, since — as contrasted to conventional flying shears which can be adjusted to an oblique position only in their entirety — solely the cutter holder needs to be pivoted, which has only a minor mass.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE DRAWINGS

A shear cage 1 has rails 7, 8, 9, 10 (FIG. 1) for the guidance of an upper cutter bar 2 and a lower cutter bar 3 in the travel direction 4 of the sheet-metal strip 6 fed by means of a pair of rolls 5 (FIGS. 2 and 3) at a uniform speed. Claws 11, 12, 13, 14 fixedly mounted to the cutter bars 2, 3 slide along these rails 7, 8, 9, 10 The upper cutter bar 2 is moved, during the cutting, at the feeding speed of the sheet-metal strip 6 by means of a gear system 15, 16 indicated on the lefthand side of FIG. 3. After the cutting step, this upper cutter bar is returned into the initial position shown on the right hand side of FIGS. 2 and 3. By means of a linear guide arrangement, explained hereinbelow, the upper cutter bar 2 imparts similar motions to the lower cutter bar 3

Figure 2:
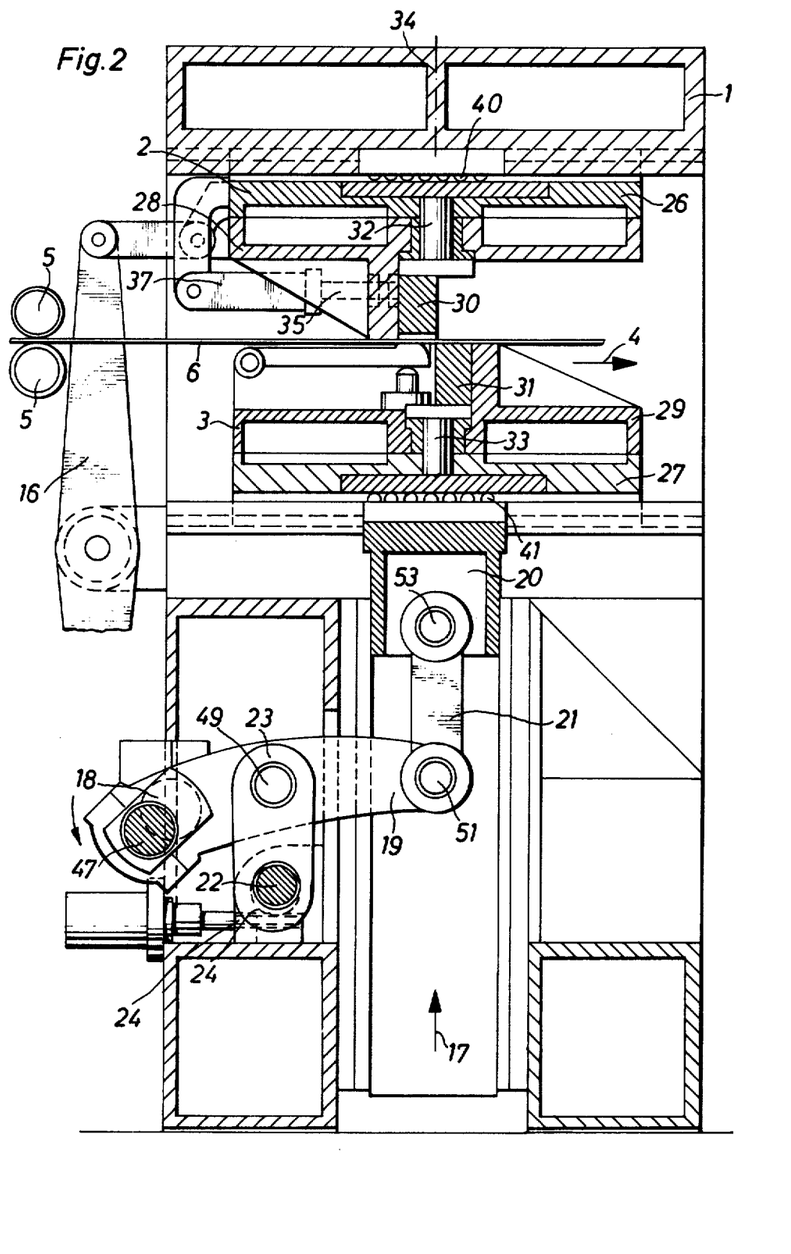
FIG. 2 is a longitudinal sectional view along line II—II of FIG. 1.

As best shown in FIG. 2, the lower cutter bar 3 is driven in the cutting direction 17 by means of a crank drive 18 rotating at a uniform speed by way of a coupling member 19 articulated to the crank drive. The movements of the coupling member 19 are transmitted to the lower cutter bar 3 via a swivel arm 21 articulated to the member 19 and to a block 20, which block 20 slides up and down in the cutting direction 17 in the shear cage 1 and is connected to be flush with the lower cutter bar 3. During one section of the thereby created upward movement of the lower cutter bar 3, the cut is executed with smooth, burr-free cutting faces, since the speed of both cutter bars 2, 3 in the horizontal coincides during the cutting step with the feeding speed of the sheet-metal strip 6. A press rod 23 swinging about a fixed axle 22 in the shear cage 1 is articulated to the coupling member 19 between the crank drive 18 and the swivel arm 21. This press rod 23 has an eccentric bevel gear 24 meshing with a rack 25 drivable in both direction of rotation, with the effect that, by changing the initial position of the block 20 (by moving press rod 23 by way of rack 25 and gear 24), the stroke position of the lower cutter bar 3 is varied. Thereby, the cutting path thereof can be adapted to various thicknesses of the sheet-metal strip 6, and the stroke range of the lower cutter bar 3 can be lowered to such an extent that the shear, in spite of the reciprocating motion of the lower cutting bar 3, no longer executes a cutting operation, thus obtaining, for example, sheet-metal strip sections of various lengths.

The upper cutter bar 2 and the lower cutter bar 3 each include a slide 26 and 27, respectively, and a cutter holder 28 and 29, respectively. The cutter holder 28 is equipped with a top blade 30 on the feeding side and cutter holder 29 is equipped with a bottom blade 31 on the discharge side. Each of the holders 28, 29 can be pivoted in both directions of rotation about a common axis 34 extending in the cutting direction 17 by being supported on respectively one collar pin 32 and 33 of equiaxial position, embedded into the associated slide 26 and 27, respectively.

Due to the above-described arrangement, the two cutter bars 2, 3 including respectively the slides 26, 27 and the cutter holders 28, 29 can be reciprocated in the travel direction 4 of the sheet-metal strip 6. However, only the cutter holders 28, 29 are pivotable about axis 34 such that sheet-metal strip sections can be obtained having the shape of a parallelogram or a trapezoid. Also, only the lower cutter bar 3, consisting of the slide 27 and the cutter holder 29, can be reciprocated in the cutting direction 17.

Figure 4:
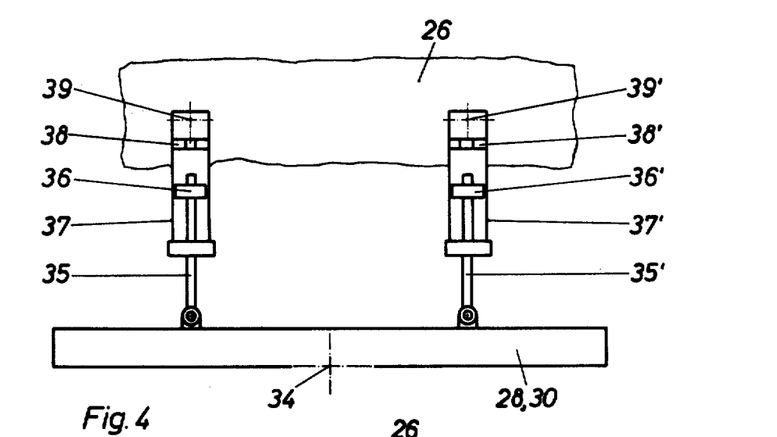
FIG. 4 is an enlarged top view which shows the mechanisms for pivoting the upper cutter holder in the position for cutting at right angles to the travel direction of the sheet-metal strip in accordance with the present invention.
Figure 5:
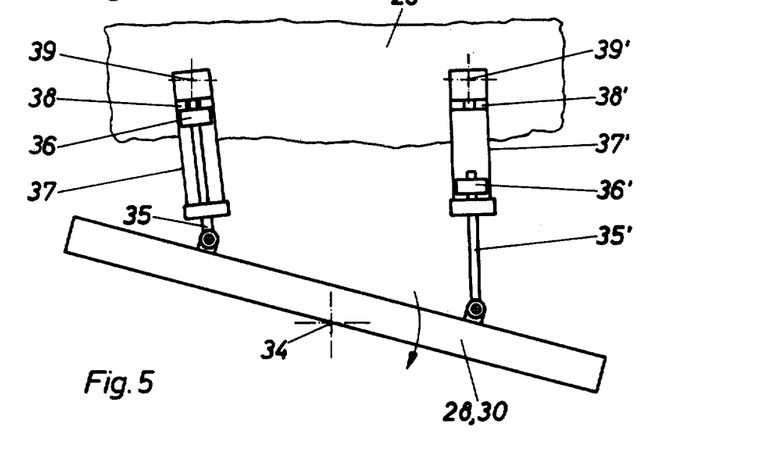
FIG. 5 is a view similar to FIG. 4 with the upper cutter holder in a position for oblique cutting operations and FIG. 6 is a motion diagram for the apparatus of FIGS. 1 to 5.

Hydraulic devices are provided for each pivoting direction of the two cutter holders 28, 29. Each hydraulic device includes a piston rod 35, 35', respectively, which is hingedly connected to the upper cutter holder 28, as well as pistons 36, 36', cylinders 37, 37', and adjustable stops 38, 38', and being pivotable at the upper slide 26 about fixed axes 39, 39' (FIGS. 4 and 5). The stops 38, 38' are adjustable so that, for example, when the piston 36' is actuated in the sense that the upper cutter holder 28 is pivoted in the clockwise direction (FIG. 5), the piston 36 of the other pivoting device comes into contact with its stop 38. Consequently each pivoting stroke is fixedly limitable and thereby the entire pivotable system is fixedly braced, which could not be achieved by the provision of only one hyraulic pivoting device, due to the compressibility of the pressure oil in the cylinders 37, 37'.

Antifriction bearings 40 and 41, respectively, disposed in the shear cage 1, serve for guiding each slide 26 and 27 and its cutter holder 28 and 29 connected with the respective slide by the collar pin 32 and 33 in a reciprocating movement in the travel direction 4 of the sheet-metal strip 6.

Figure 3:
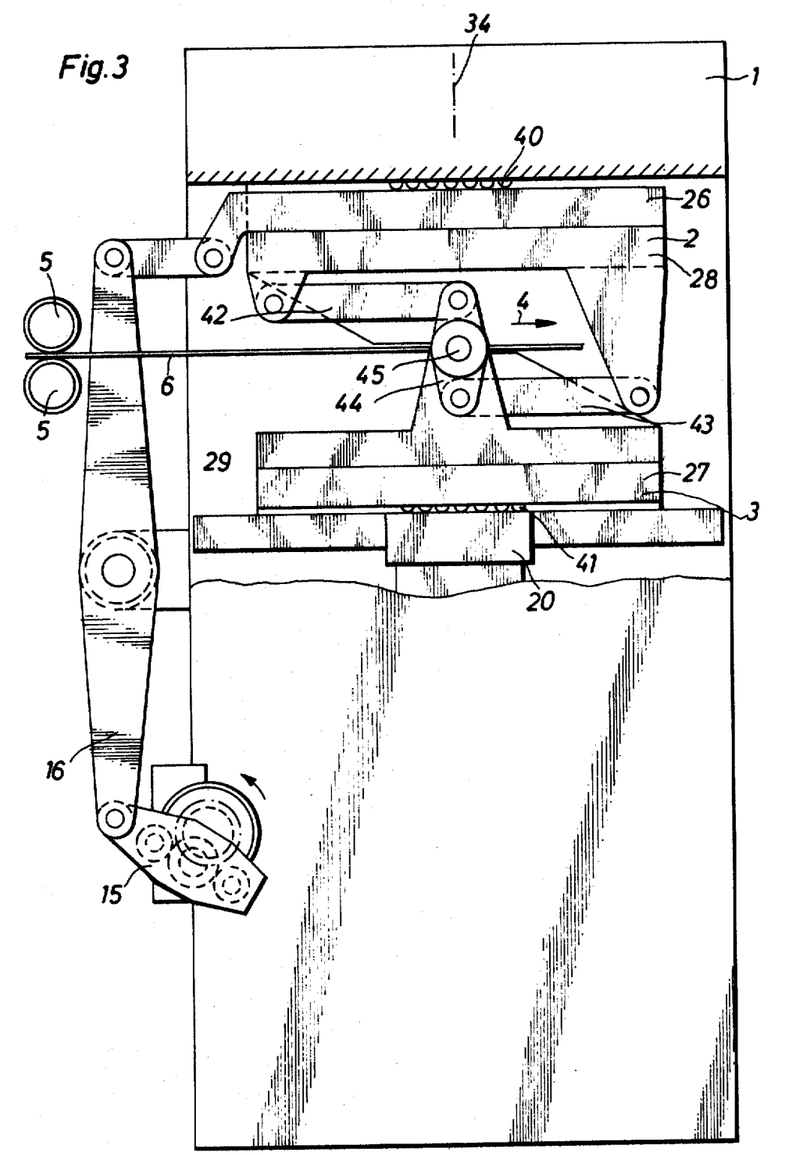
FIG. 3 is a partial schematic sectional view showing the linear guidance and drive for the cutter bars of the apparatus of FIG. 1.

The cutter bars 2, 3 are connected with each other by a linear guide means, the two guide arms 42, 43 of which are articulated to the upper cutter bar 2 (FIG. 3). The coupling member 44 of this linear guide means which hingedly connects the two guide arms 42, 43 with each other is articulated to the lower cutter bar 3 by means of a pivot pin 45, at the level of the cutting edge of the lower blade 31. The linear guide means is designed so that the longitudinal axis of the pivot pin 45 moves upwardly during the cutting motion in the cutting direction 17, i.e., at right angles to the travel direction 4 of the sheet-metal strip 6, whereby the cut is executed together with the top blade 30.

Figure 1:
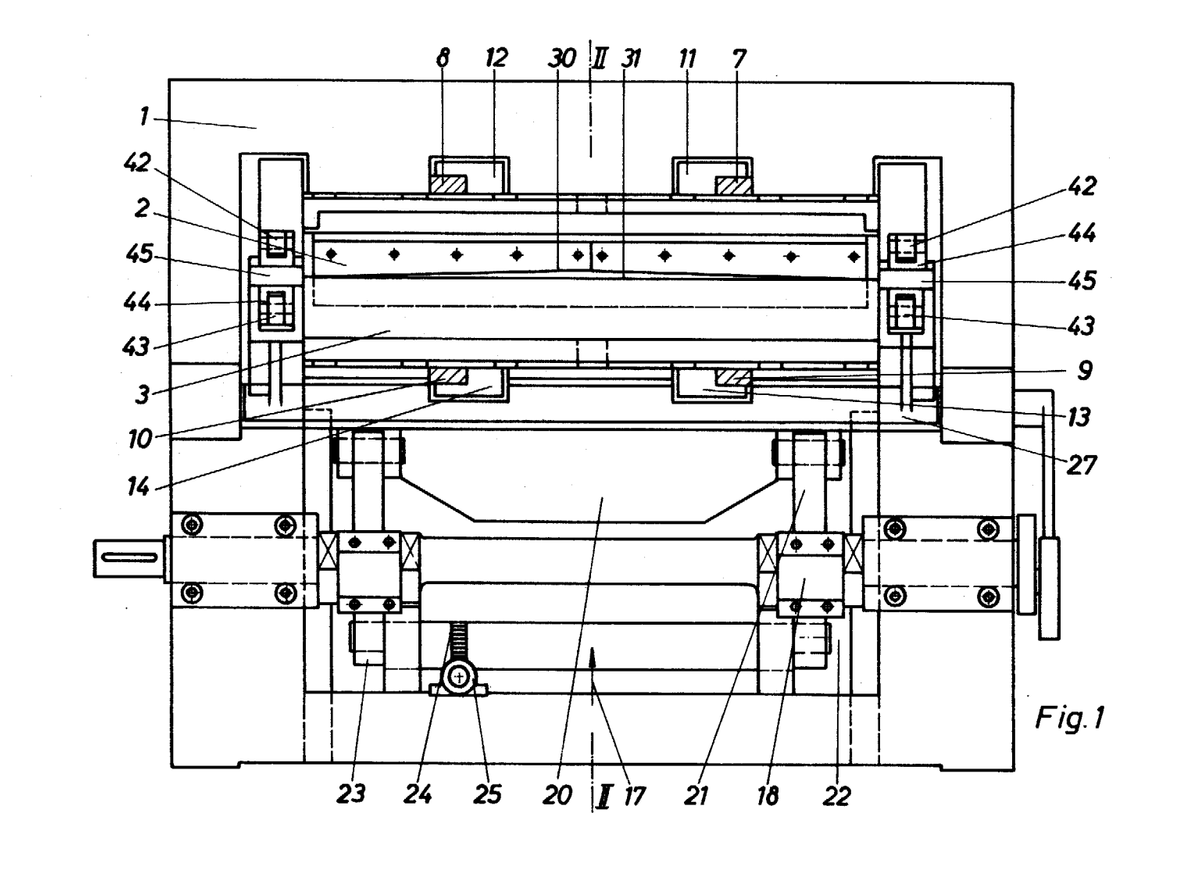
FIG. 1 is a front schematic view of shear apparatus constructed in accordance with the present invention
Figure 6:
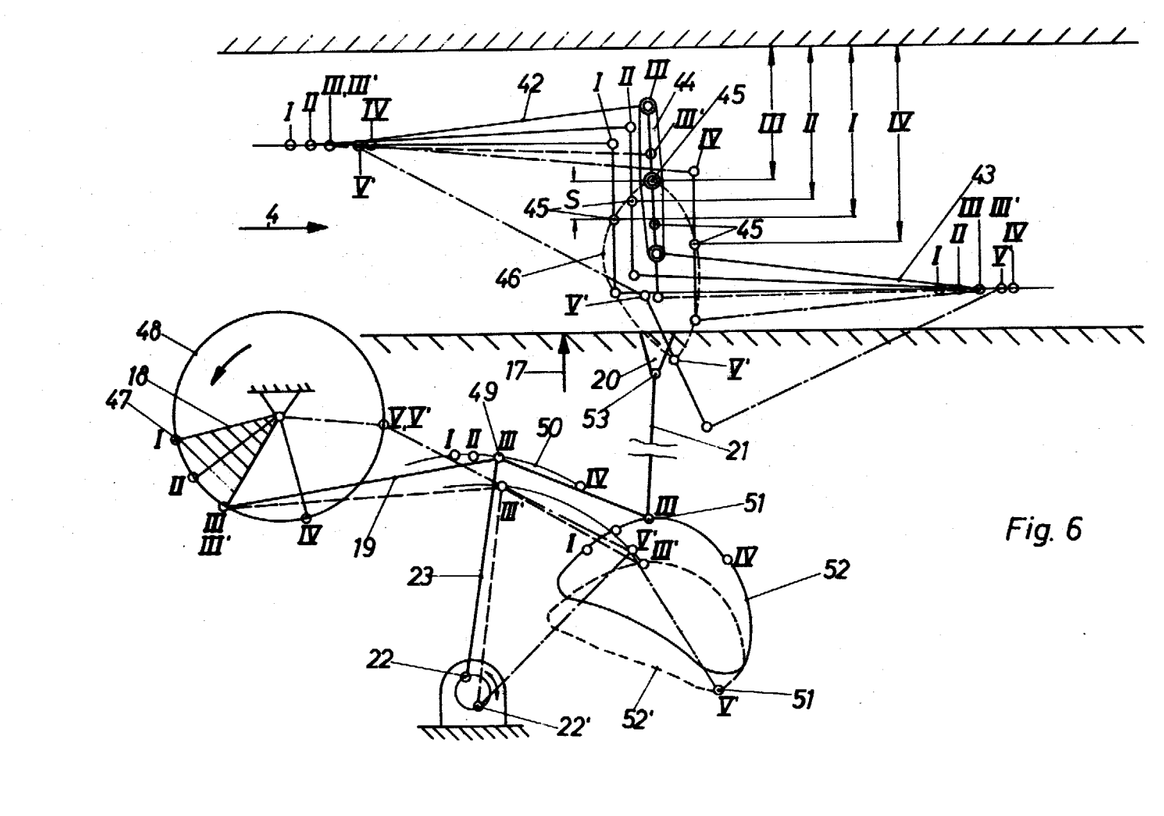

This up-and-down movement which is imparted to the bottom cutter bar 3 via the block 20 by the gear system described hereinabove, positioned according to FIG. 1 on both sides of the shear cage 1 and consisting of the crank drive 18, the coupling member 19, the press rod 23, and the swivel arm 21, is superimposed on the reciprocating movement in the travel direction 4 of the sheet-metal strip 6 imparted to the upper cutter bar 2, for example, by the gear 15, 16 and transmitted thereby to the lower cutter bar 3 by means of the linear guide. Consequently, the pivot pin 45 traverses the closed curve 46 as shown in FIG. 6. The cycles of movement and the positions of the various parts resulting therefrom which are illustrated in FIG. 6 include reference numerals corresponding to the reference numerals in FIGS. 2 and 3 for the same parts. During one rotation, the crank pin 47 of the crank drive 18 traverses the circular path 48. During this step, a pin 49, which connects the coupling member 19 hingedly with the press rod 23, swings back and forth on a circular arc 50, and a pin 51 connecting the coupling member 19 with the swivel arm 21 by a hinged coupling traverses a closed curve 52. The swivel arm 21 is articulated to the block 20 by means of a pin 53. In order to preserve clarity, the movement of the lower cutter holder 29, also executed by the slide 27 and the lower blade 31, is illustrated by the positions of the pivot pin 45.

For the cutting motion, the positions I through V of the crank pin 47 are of interest. The corresponding positions of the coupling member 19, as well as the linear guide means — couple 44 and both guide arms 42, 43 — with articulation of the guide arms 42, 43 to the slide 26, as well as of both guide arms 42, 43 to the couple 44 and the latter to the slide 27 by the pivot pin 45, are denoted by the same Roman numerals I through V. The cut is executed during the upward stroke s of the lower cutter bar 3 between the positions I and III. This cutter bar 3 then traverses positions IV and V and returns to position I after a complete revolution of the crank pin 47.

If the axle 22 is lowered by the rack 25 and the pinion 24 into position 22' (FIG. 6), then the pin 51 traverses the closed curve 52' (dash lines) which is disposed at a lower level than the curve 52, so that the stroke range of the lower cutter bar 3 is likewise lowered. The various parts then assume the positions III'. By comparing position I on curve 52 and position III' on curve 52', as well as the positions I and III' of the pivot pin 45, it can be seen that the highest position III', with the lower cutter bar 3 being lowered (axle 22 into position 22'), is lower than the initial position I of this cutter bar 3 in the normal position (axle 22). Accordingly, the stroke range of this cutter bar 3 is lowered to such an extend that the bottom blade 31 no longer engages the top blade 30, so that no cutting operation takes place.

The length of the strip sections to be severed by the shear in each case from the sheet-metal strip 6, which latter is fed at a uniform speed, can be adjusted by setting the speed of rotation of the crank drive 18, in addition to omitting the cutting movement by controlling positions of axle 22 with the rack and gear 25, 24. Adjustment of the position of axle 22 also can be made for accommodating varying thicknesses of material to be cut.

A special advantage attained with the linear guide means (FIG. 3) of this invention between the two cutter bars 2, 3 resides in that, by the hinged connections of the components of the linear guide means and by the articulated connection thereof with the cutter holders 28, 29, transverse forces at the blades 30, 31 are safely absorbed, so that — differently from a column-type guiding of the cutter bars — no clamping effects can occur even when the shear cage 1 and the cutter bars 2, 3 execute a springing motion.

The joints connecting the guide arms 42, 43 with the upper cutter bar 2 and/or with the couple 44 can have eccentric bearings, which makes it possible to adjust the cutting slot more simply and conveniently than in the conventional guidance of the cutter bars along columns.

The antifriction bearings 40, 41 absorb the cutting pressure, so that the cutter bars 2, 3 are extensively relieved outside of the cutting zone and can be manufactured in a light-weight construction.

While we have shown and described one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. Flying shear apparatus for cross-cutting moving sheet material comprising:
   a first cutting bar,
   a second cutting bar,
   first reciprocating means for reciprocating both of said bars in the travel direction of the sheet material,
   second reciprocating means for reciprocating said first bar in a cutting direction transverse to said travel direction, said first and second cutting bars being positioned in opposing relationship to one another such that said cutting bars cooperate to cut said sheet material upon a predetermined relative movement of said cutting bars in the cutting direction, said second reciprocating means including a rotatable drive shaft and drive train means drivingly connecting said drive shaft to said first bar, and cutting stroke control means for varying the distance said first bar moves in the cutting direction toward said second bar means independently of the rotational speed of the drive shaft, said cutting stroke control means including means engaged with a member of said drive train means,
   wherein said first reciprocating means includes a movable driving member attached to only one of said cutting bars and linear guide means interconnecting said cutting bars with one another for similar movement in the travel direction, and
   wherein said linear guide means includes a coupling member and first and second guide arms, said coupling member being pivotally connected to one of said cutting bars at a position intermediate the ends of said coupling member by a coupling pivot pin, said first guide arm having one end thereof pivotally connected to the other of said cutting bars and the other end thereof pivotally connected to an end of said coupling member, said second guide arm having one end thereof pivotally connected to the other of said cutting bars and the other end thereof pivotally connected to the end of said coupling member which is opposite the end of said coupling member connected to said first guide arm.

2. Apparatus according to claim 1, wherein said drive train means includes a crank member rotatable with said drive shaft and first and second levers, one end of said first lever being pivotally connected to a part which is movable with said frist bar in the cutting direction, the other end of said first lever being pivotally connected to one end of said second lever, the other end of said second lever being connected to said crank member, said second lever being pivotal about a pivot axle arranged intermediate the ends thereof.

3. Apparatus according to claim 2, wherein said cutting stroke control means includes a press rod having one end thereof connected to said pivot axle and means for changing the position of said press rod and pivot axle.

4. Apparatus according to claim 3, wherein the other end of said press rod is connected to a press rod axle by eccentric gear means, and wherein a rack is drivingly engaged with said eccentric gear means for changing the position of said press rod and pivot axle in directions transverse to the longitudinal extent of said pivot axle.

5. Apparatus according to claim 1, wherein said driving member is attached to said first cutting bar, and wherein said coupling member is pivotally connected to said second cutting bar.

6. Apparatus according to claim 1, wherein each cutter bar includes a slide and a cutter holder connected for movement together in the travel direction of the sheet material, wherein said coupling pivot pin is supported at the slide of said one of said cutting bars.

7. Apparatus according to claim 6, wherein said cutter holders are mounted for pivotal movement about a common axis which extends in the cutting direction, and wherein holder pivoting means are provided for imparting pivotal movement to said cutter holders.

8. Apparatus according to claim 7, wherein said cutter holder pivoting means includes a pair of spaced piston-cylinder means for said cutter holder.

9. Apparatus according to claim 8, wherein adjustable stop means are provided in each piston-cylinder means for limiting the stroke of relative movement of a piston and cylinder of each of said piston-cylinder means, wherein the piston-cylinder means for said cutter bar are arranged at opposite sides of said common axis with the piston thereof connected to one of said respective slide and cutter bar and the cylinder thereof connected to the other of said respective slide and cutter bar.

10. Apparatus according to claim 1, wherein the joints connecting the guide arms at the cutter bar and/or at the coupling member have eccentric bearings.

11. Apparatus according to claim 1, wherein said sheet material is sheet-metal strip material, and further comprising feed roller means engageable with said strip material for feeding said material in the travel direction at a constant speed.

12. Apparatus according to claim 11, further comprising means for rotatably driving said drive shaft at a constant rotative speed.

13. Apparatus according to claim 12, wherein said cutting stroke control means includes means for shortening the distance said first bar moves to such an extent that no cutting takes place on strip material being fed between said first and second cutting bars.

14. Apparatus according to claim 13, wherein said drive train means includes a crank member rotatable with said drive shaft and first and second levers, one end of said first lever being pivotally connected to a part which is movable with said first bar in the cutting direction, the other end of said first lever being pivotally connected to one end of said second lever, the other end of said second lever being connected to said crank member, said second lever being pivotal about a pivot axle arranged intermediate the ends thereof.

15. Flying shear apparatus for cross-cutting moving sheet material comprising:
a first cutting bar,
a second cutting bar,
first reciprocating means for reciprocating both of said bars in the travel direction of the sheet material,
second reciprocating means for reciprocating said first bar in a cutting direction transverse to said travel direction, said first and second cutting bars being positioned in opposing relationship to one another such that said cutting bars cooperate to cut said sheet material upon a predetermined relative movement of said cutting bars in the cutting direction, said second reciprocating means including a rotatable drive shaft and drive train means drivingly connecting said drive shaft to said first bar,
and cutting stroke control means for varying the distance said first bar moves in the cutting direction toward said second bar means independently of the rotational speed of the drive shaft, said cutting stroke control means including means engaged with a member of said drive train means,
wherein each cutter bar includes a slide and a cutter holder connected for movement together in the travel direction of the sheet material, and wherein said cutter holders are mounted for pivotal movement about a common axis which extends in the cutting direction,
wherein cutter holder pivoting means are provided for imparting pivotal movement to said cutter holders,
wherein said cutter holder pivoting means includes a pair of spaced piston-cylinder means for said cutter holder, and
wherein adjustable stop means are provided in each piston-cylinder means for limiting the stroke of relative movement of a piston and cylinder of each of said piston-cylinder means, wherein the piston-cylinder means for said cutter bar are arranged at opposite sides of said common axis with the piston thereof connected to one of said respective slide and cutter bar and the cylinder thereof connected to the other of said respective slide and cutter bar.

16. Apparatus according to claim 15, wherein said drive train means includes a crank member rotatable with said drive shaft and first and second levers, one end of said first lever being pivotally connected to a part which is movable with said first bar in the cutting direction, the other end of said first lever being pivotally connected to one end of said second lever, the other end of said second lever being connected to said crank member, said second lever being pivotal about a pivot axle arranged intermediate the ends thereof.

17. Apparatus according to claim 16, wherein said cutting stroke control means includes a press rod having one end thereof connected to said pivot axle and means for changing the position of said press rod and pivot axle.

18. Apparatus according to claim 17, wherein the other end of said press rod is connected to a press rod axle by eccentric gear means, and wherein a rack is drivingly engaged with said eccentric gear means for changing the position of said press rod and pivot axle in directions transverse to the longitudinal extent of said pivot axle.

19. Apparatus according to claim 16, wherein said first reciprocating means includes a movable driving member attached to only one of said cutting bars and linear guide means interconnecting said cutting bars with one another for similar movement in the travel direction.

20. Apparatus according to claim 19, wherein said linear guide means includes a coupling member and first and second guide arms, said coupling member being pivotally connected to one of said cutting bars at a position intermediate the ends of said coupling member by a coupling pivot pin, said first guide arm having one end thereof pivotally connected to the other of said cutting bars and the other end thereof pivotally connected to an end of said coupling member, said second guide arm having one end thereof pivotally connected to the other of said cutting bars and the other end thereof pivotally connected to the end of said coupling member which is opposite the end of said coupling member connected to said first guide arm.

21. Apparatus according to claim 20, wherein said driving member is attached to said first cutting bar, and wherein said coupling member is pivotally connected to said second cutting bar.

22. Apparatus according to claim 1, wherein each cutter bar includes a slide and a cutter holder connected for movement together in the travel direction of the sheet material, and wherein said cutter holders are mounted for pivotal movement about a common axis which extends in the cutting direction.

23. Flying shear apparatus for cross-cutting moving sheet material comprising:
a first cutting bar,
a second cutting bar,
first reciprocating means for reciprocating both of said bars in the travel direction of the sheet material,
and second reciprocating means for reciprocating said first bar in a cutting direction transverse to said travel direction, said first and second cutting bars being positioned in opposing relationship to one another such that said cutting bars cooperate to cut said sheet material upon a predetermined relative movement of said cutting bars in the cutting direction, said second reciprocating means including a rotatable drive shaft and drive train means drivingly connecting said drive shaft to said first bar,
wherein said first reciprocating means includes a movable driving member attached to only one of said cutting bars and linear guide means interconnecting said cutting bars with one another for similar movement in the travel direction, and wherein said linear guide means includes a coupling member and first and second guide arms, said coupling member being pivotally connected to one of said cutting bars at a position intermediate the ends of said coupling member by a coupling pivot pin, said first guide arm having one end thereof pivotally connected to the other of said cutting bars and the other end thereof pivotally connected to an end of said coupling member, said second guide arm having one end thereof pivotally connected to the other of said cutting bars and the other end thereof pivotally connected to the end of said coupling member which is opposite the end of said coupling member connected to said first guide arm.

24. Flying shear apparatus for cross-cutting moving sheet material comprising:

a first cutting bar, a second cutting bar, first reciprocating means for reciprocating both of said bars in the travel direction of the sheet material, and second reciprocating means for reciprocating said first bar in a cutting direction transverse to said travel direction, said first and second cutting bars being positioned in opposing relationship to one another such that said cutting bars cooperate to cut said sheet material upon a predetermined relative movement of said cutting bars in the cutting direction, said second reciprocating means including a rotatable drive shaft and drive train means drivingly connecting said drive shaft to said first bar, wherein each cutter bar includes a slide and a cutter holder connected for movement together in the travel direction of the sheet material, and wherein said cutter holders are mounted for pivotal movement about a common axis which extends in the cutting direction, wherein cutter holder pivoting means are provided for imparting pivotal movement to said cutter holders, wherein said cutter holder pivoting means includes a pair of spaced piston-cylinder means for said cutter holder, and wherein adjustable stop means are provided in each piston-cylinder means for limiting the stroke of relative movement of a piston and cylinder of each of said piston-cylinder means, wherein the piston-cylinder means for said cutter bar are arranged at opposite sides of said common axis with the piston thereof connected to one of said respective slide and cutter bar and the cylinder thereof connected to the other of said respective slide and cutter bar.

* * * * *